United States Patent
Wolf et al.

(10) Patent No.: US 6,285,958 B1
(45) Date of Patent: *Sep. 4, 2001

(54) ELECTRONIC CIRCUIT FOR AUTOMATIC COMPENSATION OF A SENSOR OUTPUT SIGNAL

(75) Inventors: Ronald J. Wolf, Elkhart, IN (US); Mark William Austin, Burleson, TX (US)

(73) Assignee: American Electronic Components, Inc., Elkhart, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,136

(22) Filed: Feb. 12, 1998

(51) Int. Cl.$^7$ .................................................... G01D 18/00
(52) U.S. Cl. ............................................. 702/87; 324/601
(58) Field of Search ............................. 702/85–88, 127, 702/189; 324/600, 601

(56) References Cited

U.S. PATENT DOCUMENTS

| | | |
|---|---|---|
| 2,942,177 | 6/1960 | Neumann et al. . |
| 2,992,369 | 7/1961 | LaRocca . |
| 3,060,370 | 10/1962 | Varterasian . |
| 3,112,464 | 11/1963 | Ratajski et al. . |
| 3,118,108 | 1/1964 | Zoss et al. . |
| 3,185,920 | 5/1965 | Brunner . |
| 3,473,109 | 10/1969 | Maaz et al. . |
| 3,482,163 | 12/1969 | Peek et al. . |
| 3,818,292 | 6/1974 | Berman . |
| 3,988,710 | 10/1976 | Sidor et al. . |
| 4,066,962 | 1/1978 | Jaffe . |
| 4,086,533 | 4/1978 | Ricouard et al. . |
| 4,107,604 | 8/1978 | Bernier . |
| 4,156,191 | 5/1979 | Knight et al. . |
| 4,293,814 | 10/1981 | Boyer . |

(List continued on next page.)

FOREIGN PATENT DOCUMENTS

| | | |
|---|---|---|
| 1 416 925 | 8/1973 | (DE) . |
| 31 50 013 | 6/1983 | (DE) . |
| 4014885 A1 | 5/1990 | (DE) . |
| 43 02 184.0 | 7/1994 | (DE) . |
| 296 22 602 | 4/1997 | (DE) . |
| 0 053 938 | 12/1981 | (EP) . |
| 0 363 738 | 4/1990 | (EP) . |
| 0 626 562 A1 | 11/1994 | (EP) . |
| 0 0780592 A | 12/1995 | (EP) . |
| 2 221 039 | 1/1990 | (GB) . |

(List continued on next page.)

OTHER PUBLICATIONS

Ravi, Vig, "Power Hall–Effect Sensor Take to the Road", *Machine Design*, Aug. 23, 1990, pp. 113–119.

Obermeier, E., et al., "A Smart Pressure Sensor with On–Chip Calibration and Compensation Capability", Institute of Microelectronic Circuits and Systems, Mar., 1995 pp. 20–22, 52–54.

*Primary Examiner*—Kamini Shah
*Assistant Examiner*—Craig Steven Miller
(74) *Attorney, Agent, or Firm*—Katten Muchin Zavis

(57) ABSTRACT

An electronic circuit dynamically compensates a sensor output signal subject to varying conditions. In particular, the circuitry dynamically determines the DC offset level of an incoming sensor analog output signal. The DC amplitude or offset level varies as a result of changing conditions, such as speed, airgap, alignment and temperature. The circuitry compares the DC offset level with the original sensor analog output signal by way of a comparator to provide a digital output signal with a zero DC offset, which compensates for the varying conditions.

7 Claims, 13 Drawing Sheets

U.S. PATENT DOCUMENTS

| | | |
|---|---|---|
| 4,293,837 | 10/1981 | Jaffe et al. . |
| 4,367,721 | 1/1983 | Boyer . |
| 4,377,088 | 3/1983 | Evert . |
| 4,392,375 | 7/1983 | Eguchi et al. . |
| 4,524,932 | 6/1985 | Bodziak . |
| 4,570,118 | 2/1986 | Tomczak et al. . |
| 4,731,579 | 3/1988 | Peterson . |
| 4,745,363 | 5/1988 | Carr et al. . |
| 4,771,237 | 9/1988 | Daley . |
| 4,789,930 * | 12/1988 | Sones et al. ............... 378/207 |
| 4,795,904 | 1/1989 | Richards . |
| 4,798,920 | 1/1989 | Makino et al. . |
| 4,829,236 * | 5/1989 | Brenardi et al. ............ 324/74 |
| 4,829,248 | 5/1989 | Loubier . |
| 4,857,842 | 8/1989 | Sturman et al. . |
| 4,873,655 | 10/1989 | Kondraske . |
| 4,893,502 | 1/1990 | Kubota et al. . |
| 4,922,197 | 5/1990 | Juds . |
| 4,958,139 * | 9/1990 | Hyatt ........................... 341/139 |
| 4,970,463 | 11/1990 | Wolf et al. . |
| 4,992,731 | 2/1991 | Lorenzen . |
| 5,045,920 | 9/1991 | Vig et al. . |
| 5,087,879 | 2/1992 | Sugifune et al. . |
| 5,144,233 | 9/1992 | Christenson et al. . |
| 5,159,268 | 10/1992 | Wu . |
| 5,164,668 | 11/1992 | Alfors . |
| 5,184,062 * | 2/1993 | Ladwig ........................ 324/74 |
| 5,274,328 | 12/1993 | Begin et al. . |
| 5,285,154 | 2/1994 | Burreson . |
| 5,291,133 | 3/1994 | Gokhale et al. . |
| 5,311,124 | 5/1994 | Hubbard et al. . |
| 5,332,965 | 7/1994 | Wolf et al. . |
| 5,341,097 | 8/1994 | Wu . |
| 5,351,003 | 9/1994 | Bauer et al. . |
| 5,363,361 | 11/1994 | Bakx . |
| 5,369,361 | 11/1994 | Wada . |
| 5,389,889 | 2/1995 | Towne et al. . |
| 5,406,200 | 4/1995 | Begin et al. . |
| 5,442,283 | 8/1995 | Vig et al. . |
| 5,459,398 | 10/1995 | Hansen et al. . |
| 5,477,142 | 12/1995 | Good et al. . |
| 5,479,096 * | 12/1995 | Szczyrbak et al. ............ 324/132 |
| 5,493,219 | 2/1996 | Makino et al. . |
| 5,497,081 | 3/1996 | Wolf et al. . |
| 5,497,084 | 3/1996 | Bicking . |
| 5,510,706 | 4/1996 | Good . |
| 5,650,719 | 7/1997 | Moody et al. . |
| 5,694,038 | 12/1997 | Moody et al. . |
| 5,729,130 | 3/1998 | Moody et al. . |

FOREIGN PATENT DOCUMENTS

| | | |
|---|---|---|
| 2 221 039 A | 1/1990 | (GB) . |
| 2 251 948 | 7/1992 | (GB) . |
| 2 251 948 A | 7/1992 | (GB) . |
| 2 297 622 | 8/1996 | (GB) . |
| 56-107119(A) | 8/1981 | (JP) . |
| 82 03121 A | 9/1982 | (WO) . |
| WO 88/07172 | 9/1988 | (WO) . |
| WO 94/12940 | 6/1994 | (WO) . |

* cited by examiner

ELECTRONIC CIRCUIT FOR AUTOMATIC COMPENSATION OF A SENSOR OUTPUT SIGNAL

BACKGROUND OF THE INVENTION

1. Field of the Invention

The present invention relates to an electronic circuit and more particularly to an electronic circuit for automatically compensating for variations in the output signal of a sensor due to changing conditions.

2. Description of the Prior Art

Many known sensors including linear displacement type sensors are known to be used in less than ideal environments due to the particular applications. For example, sensors used in automotive applications are subject to particularly harsh environments. Examples of such sensors are proximity sensors used, for example in automotive timing circuits as well as throttle position sensors used in automotive throttle circuits.

The relatively harsh environments as well as other dynamic factors contribute to the errors in the output signals of such sensors. These errors in the output signals of the sensors can cause improper operation of the circuits in which they are used. As such, various sensors and circuitry have been developed to compensate for such errors. For example, U.S. Pat. Nos. 4,893,502 and 5,332,965 relate to throttle position sensors. The throttle position sensors disclosed in the '502 and '965 patents are configured to enable the sensor to be mechanically adjusted to compensate for various errors. Unfortunately, such mechanical adjustments are relatively time consuming and cumbersome and tend to increase the overall labor cost to manufacture the product. Moreover, with such sensors, the sensor is only adapted to be adjusted one time. Thus, dynamic conditions, such as variations in the air gap and temperature, at which the sensor is operated remains uncompensated and thus allows for errors in the output signal.

SUMMARY OF THE INVENTION

The electronic circuitry in accordance with the present invention dynamically compensates for varying conditions. In particular, the circuitry dynamically determines the magnetic DC offset level of an incoming sensor analog output signal. The DC amplitude or offset level varies as a result of changing conditions such as speed, airgap, alignment and temperature. The circuitry compares the magnetic DC offset level with the original sensor analog output signal by way of a comparator to provide a digital output signal with a zero DC offset, which compensates for varying conditions.

DETAILED DESCRIPTION OF THE PREFERRED EMBODIMENTS

In accordance with the invention, dynamic circuitry is provided that is adapted to be used virtually with any linear type sensor, for example, a linear Hall effect sensor, such as a linear Hall effect sensor, such as an Allegro model no. 3516. The electronic circuitry automatically compensates for DC offsets in the sensor output signal which result from configuration of the sensor relative to the magnet as well as other factors, such as air gap, temperature shift, mechanical stack up and misalignment within the sensing package. These factors are known to cause changes in the amplitude of the sensor output signal and in particular the DC offset level of the sensor output signal. As used herein, the DC offset of a signal refers to the DC or average value of the signal relative to zero volts. In this embodiment, the DC offset of the sensor output signal is determined and compared with the original signal by way of a comparator in order to automatically provide a symmetric output signal with a zero DC offset. As such, with such an embodiment, manual DC offset adjustment of the sensor is no longer required.

An important aspect of the invention is that the sensor output signal is processed in real time. As will be discussed in more detail below, the circuitry incorporates a microprocessor which determines the DC offset of the signal. In embodiments where the sensor output signal is analog, the DC offset level is determined in parallel with the digitizing of the analog signal. The DC offset level is applied to a high speed comparator and compared with the original input signal. Since the original signal is applied directly to the high speed comparator, the system is indifferent to the computation time lag associated with the microprocessor.

Figure 1:
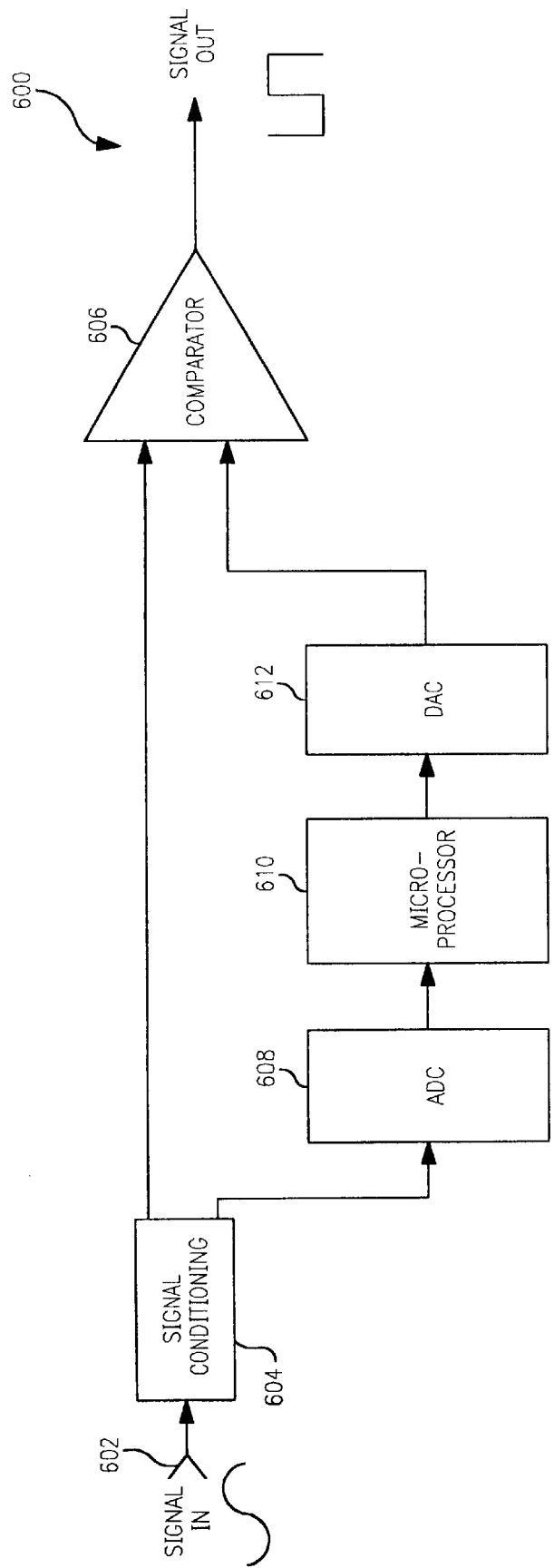
FIG. 1 is a block diagram of the electronic circuitry in accordance with the present invention.

Referring to FIG. 1, an automatic dynamic compensation circuit 600 is illustrated for automatically compensating for the DC offset from a sensor output signal. As shown in FIG. 1, an analog input signal, for example, is applied to an input terminal 602. As used herein, the analog input signal may be any linear signal or a linear portion of sinusoidal or other signal. As shown in FIG. 1, the input analog signal is initially applied to signal conditioning circuitry, generally represented by the block 604. The signal conditioning circuitry does not form a part of the present invention but may include a preamplifier with automatic gain control. Such circuitry is well known within the art. An important aspect of the invention is that the analog input signal, after being conditioned by the signal conditioning circuitry 604, is applied to a high speed comparator 606 as well as to an analog to digital converter (ADC) 608. The ADC 608 may be, for example, an 8 bit ADC with a track and hold function, for example, a model number AD7821 as manufactured by Analog Devices. The digitized sensor output is then applied to a microprocessor 610, for example an 8 bit microprocessor for example, a Microchip model number PIC16C5X. The microprocessor 610 determines the maximum and minimum peak to peaks of the sensor output signal in order to calculate a DC offset as will be discussed in more detail below. The DC offset level is then applied to a digital to analog converter (DAC) 612, for example, an 8 bit model no. AD557 as manufactured by Analog Devices. The output of the DAC 612 is an analog output signal which represents the DC offset of the original input signal. The DC offset level is compared with the original signal by way of the high speed comparator, for example, a National Semiconductor, model no. LMC 6492 operational amplifier. The output of the comparator 606 provides a digital output signal between 0 DC the supply voltage. By comparing the DC offset with the original signal, the circuitry 600 in accordance with the present invention provides a dynamic adjustment of the analog input signal to compensates for DC offsets.

Figure 2A:
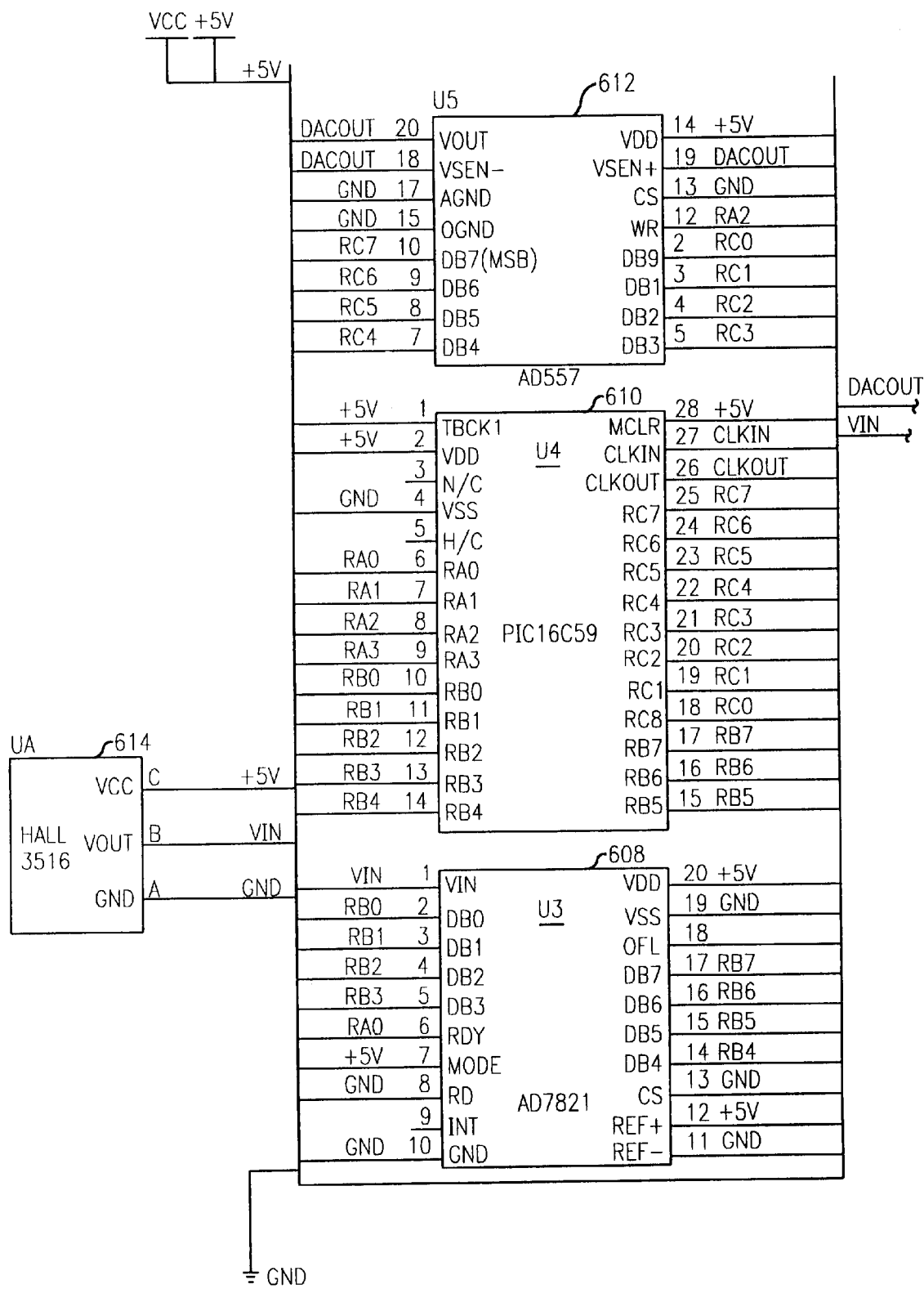
FIG. 2 is a schematic diagram of the electronic circuitry illustrated in FIG. 1.
Figure 2B:
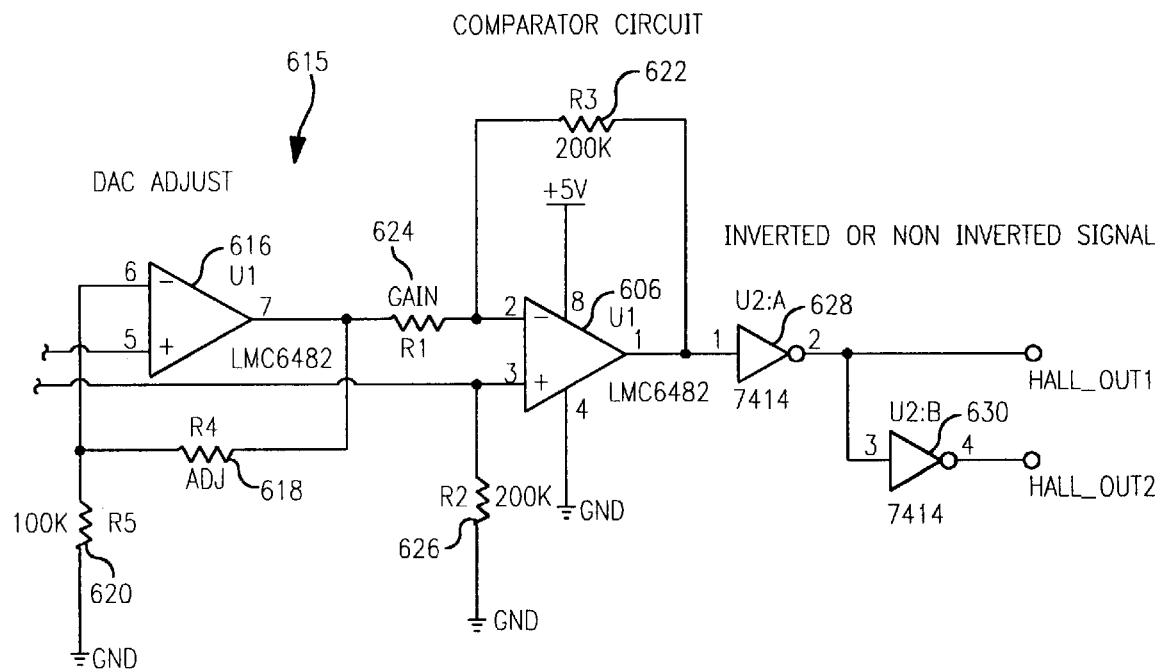
Figure 3A:
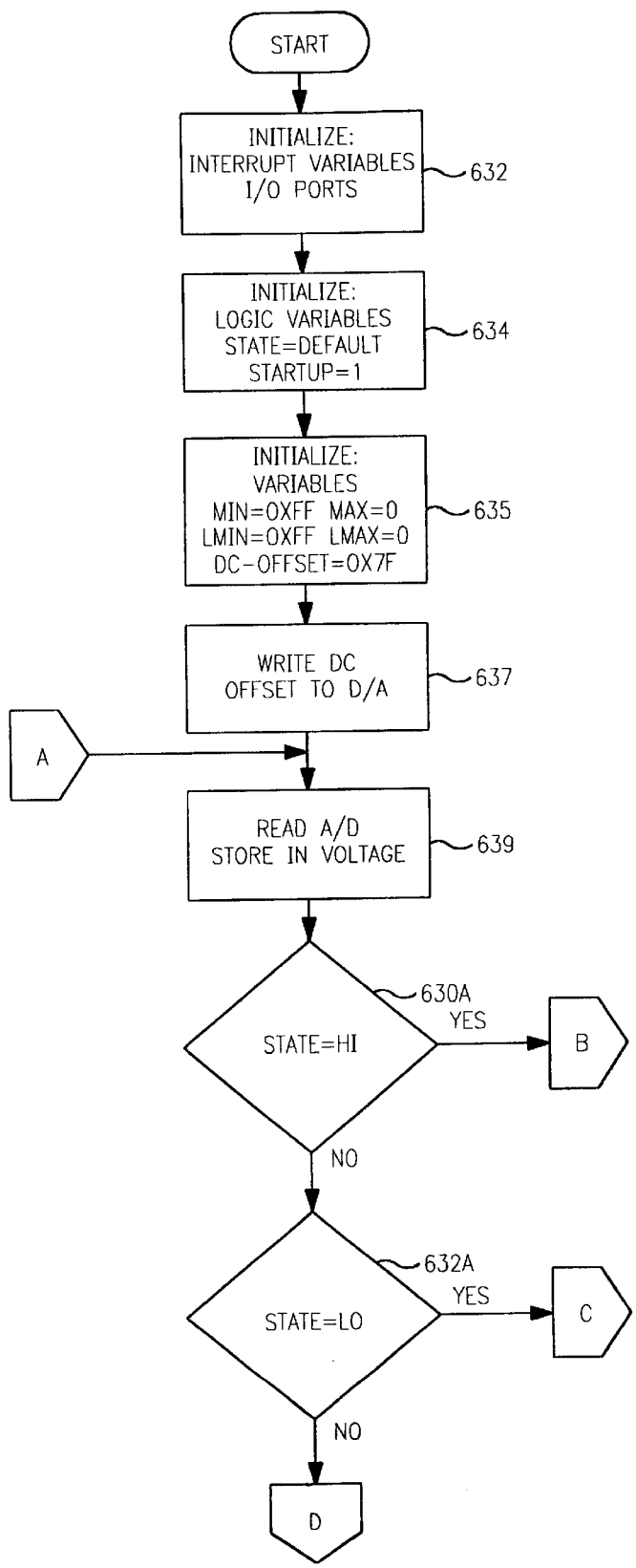
FIGS. 3a–3d are flow charts of the software for the electronic circuitry illustrated in FIG. 2.
Figure 3B:
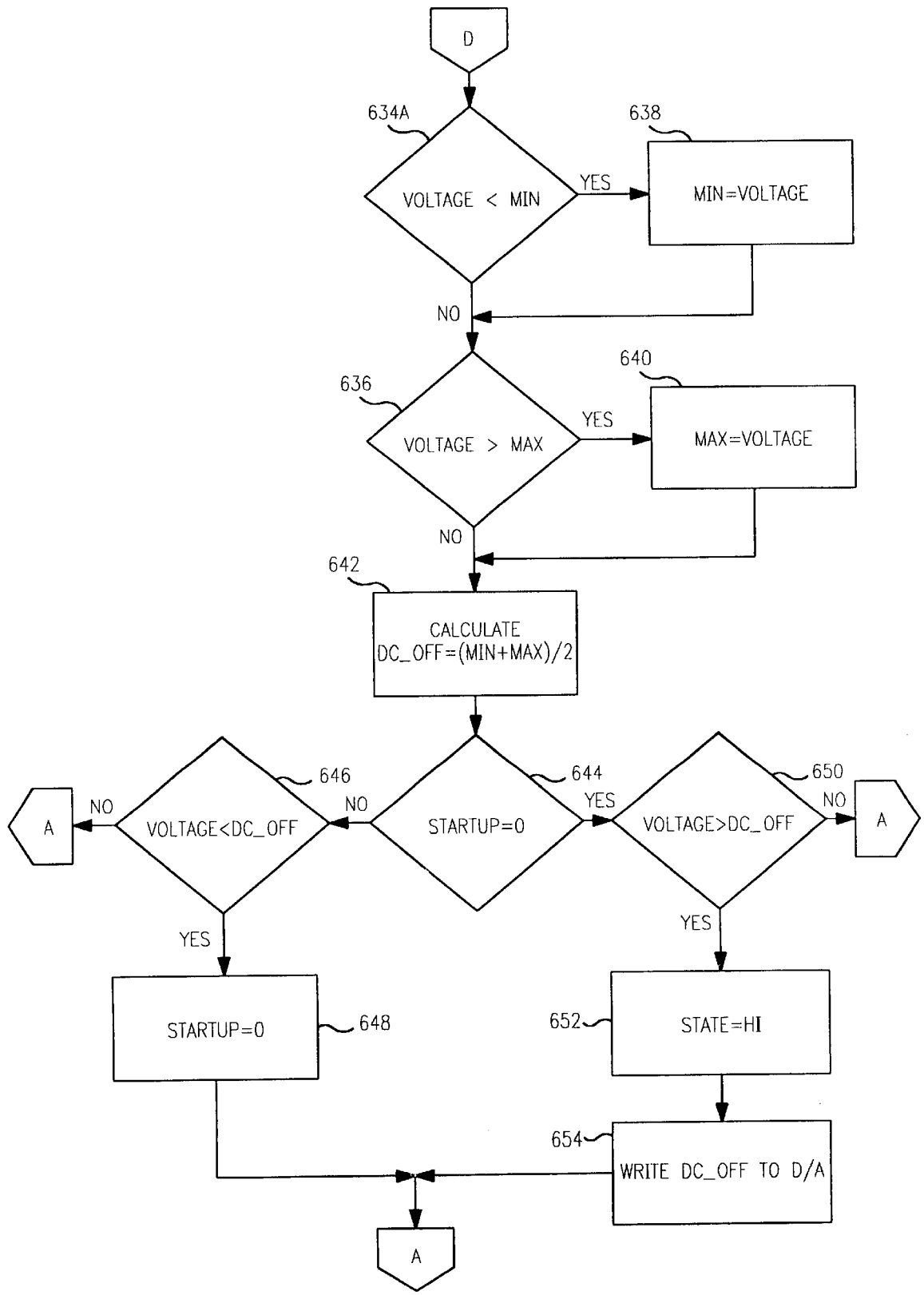
Figure 3C:
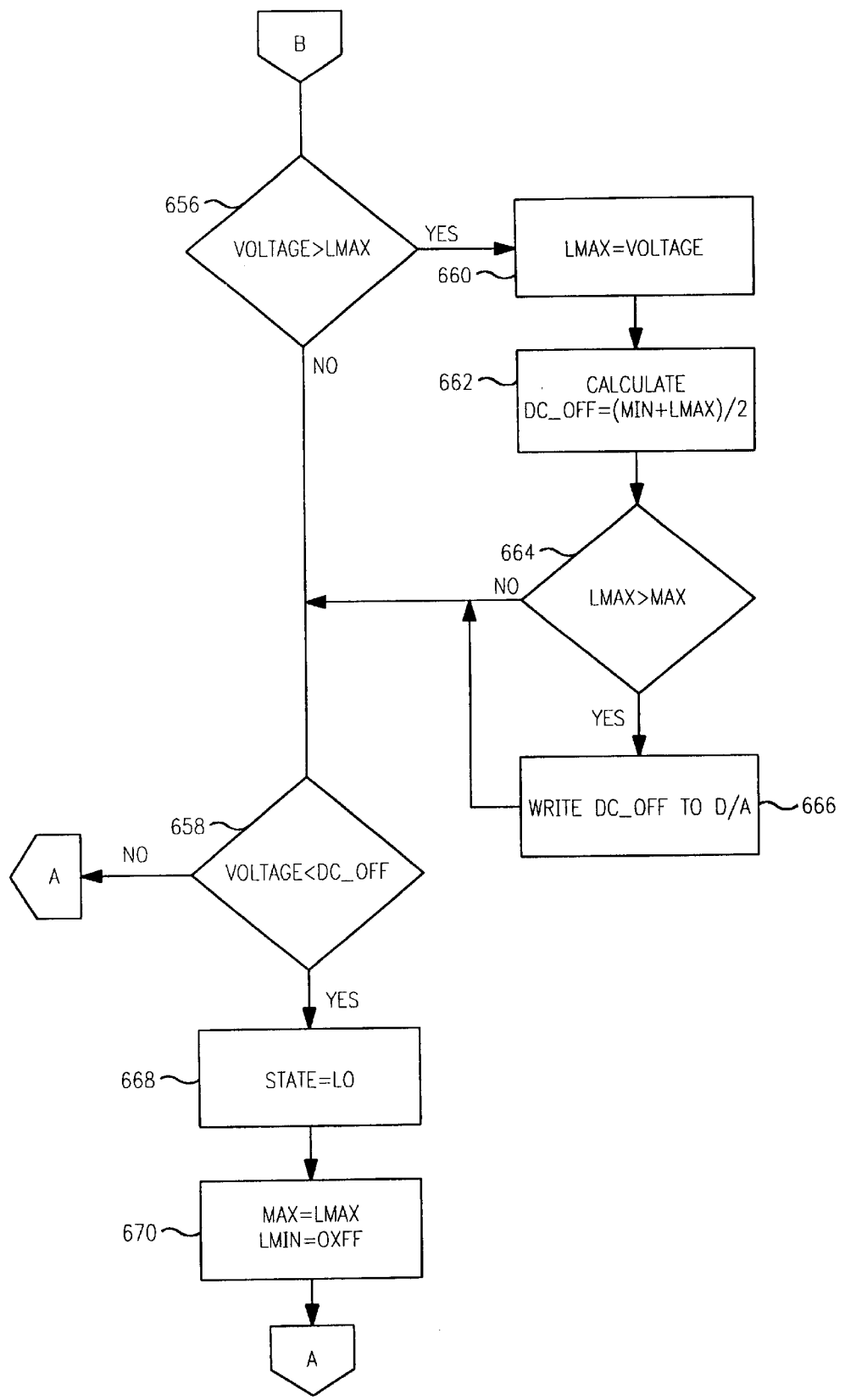
Figure 3D:
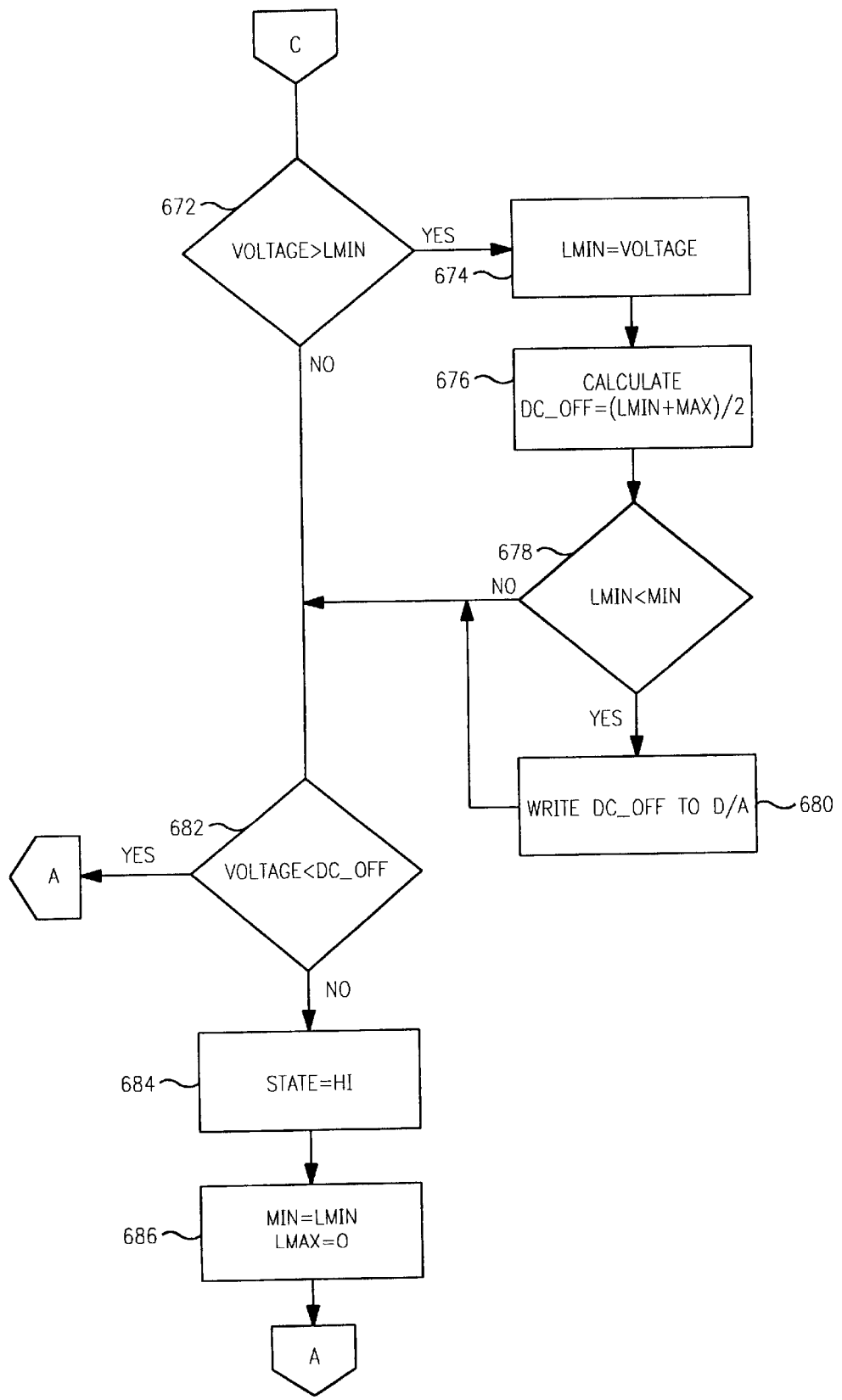
Figure 4A:
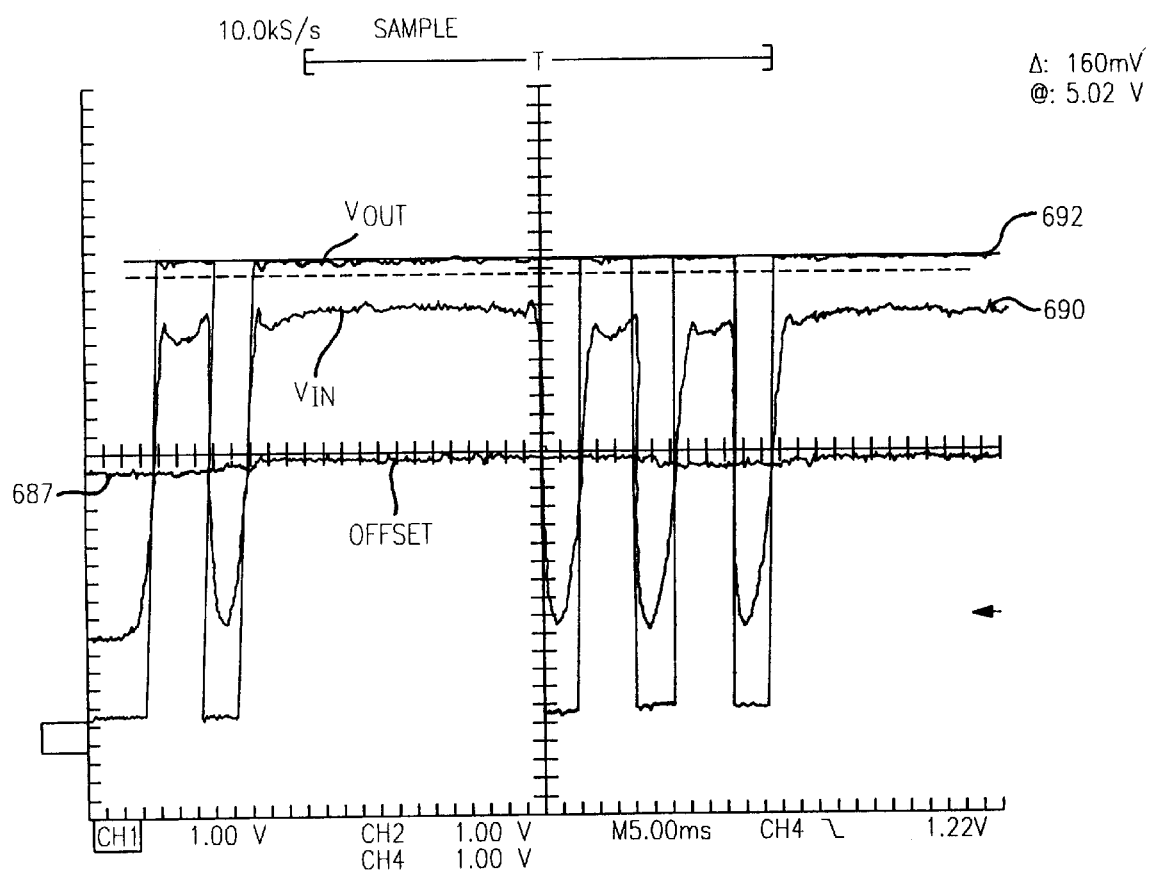
FIGS. 4a–4f are exemplary graphical illustrations of analog input signal at various DC offsets and the corresponding digital output from the electronic circuitry in accordance with present invention.
Figure 4B:
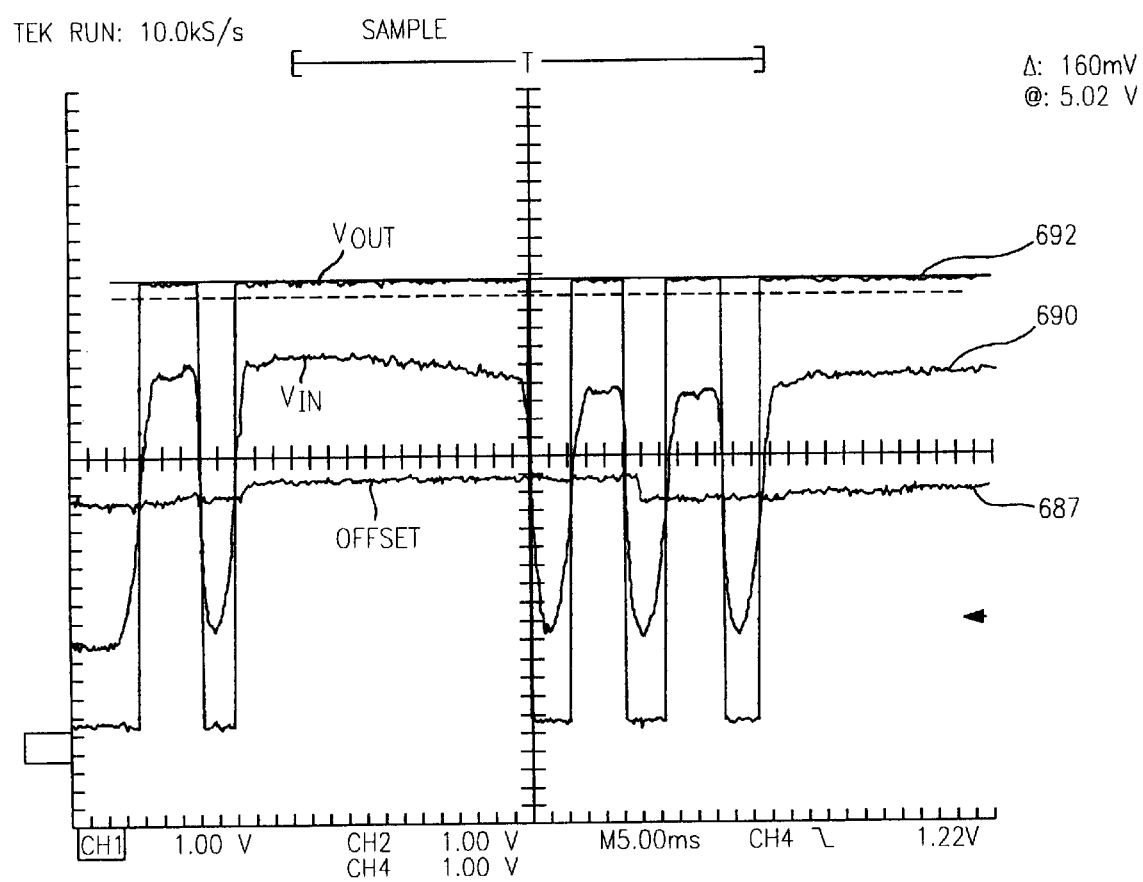
Figure 4C:
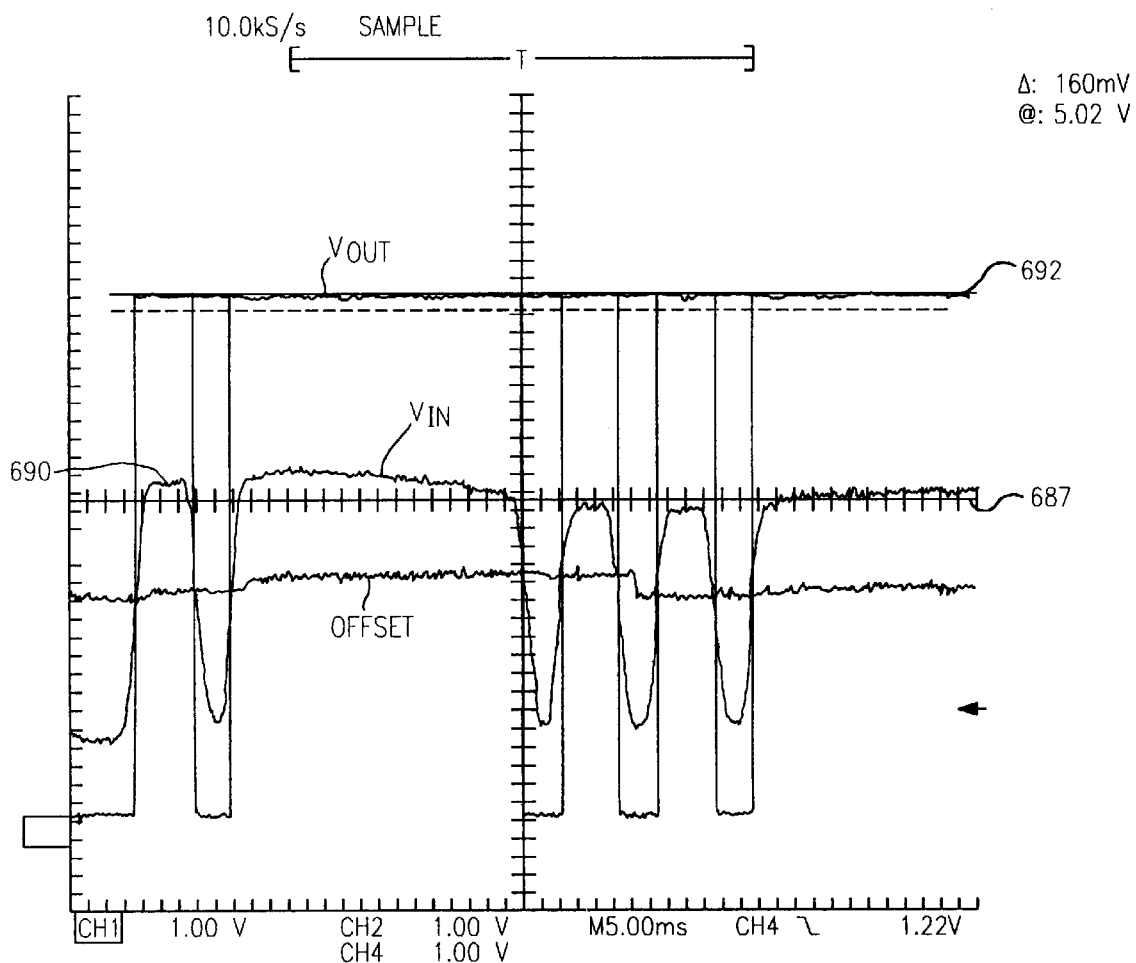
Figure 4D:
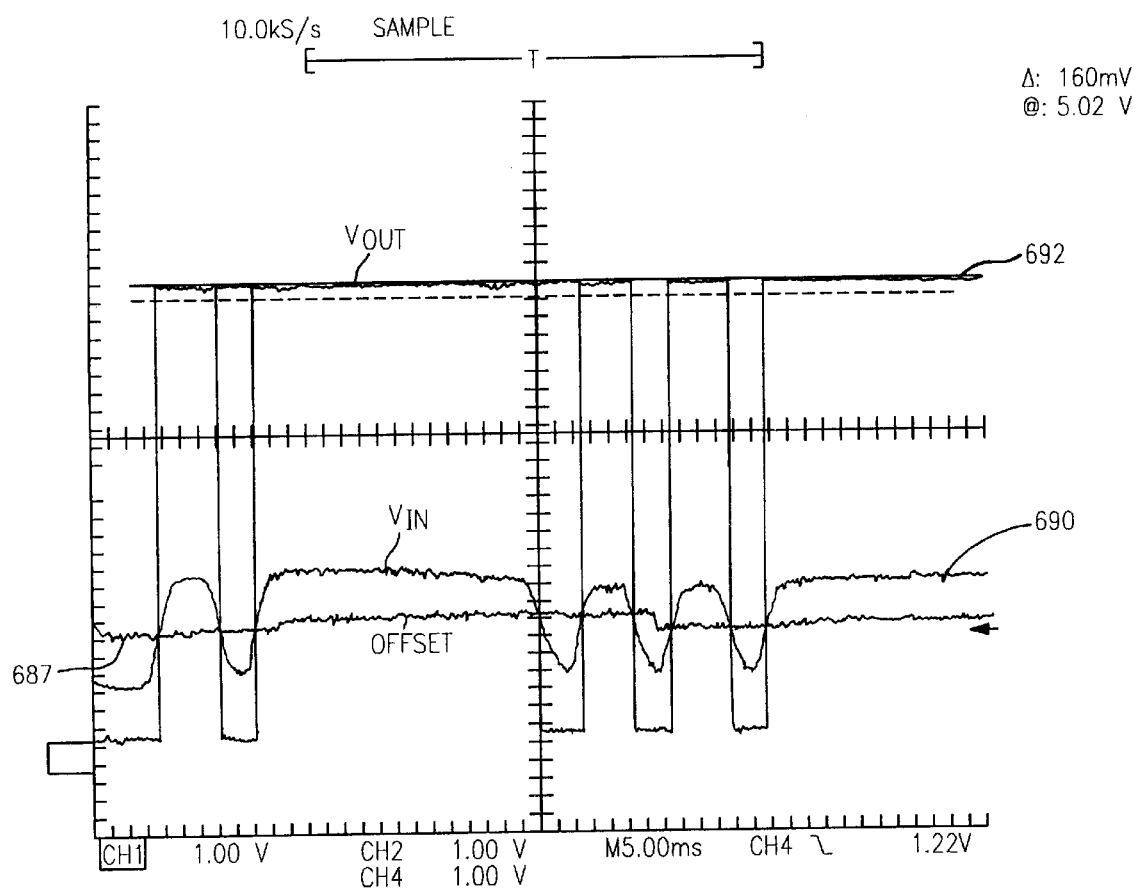
Figure 4E:
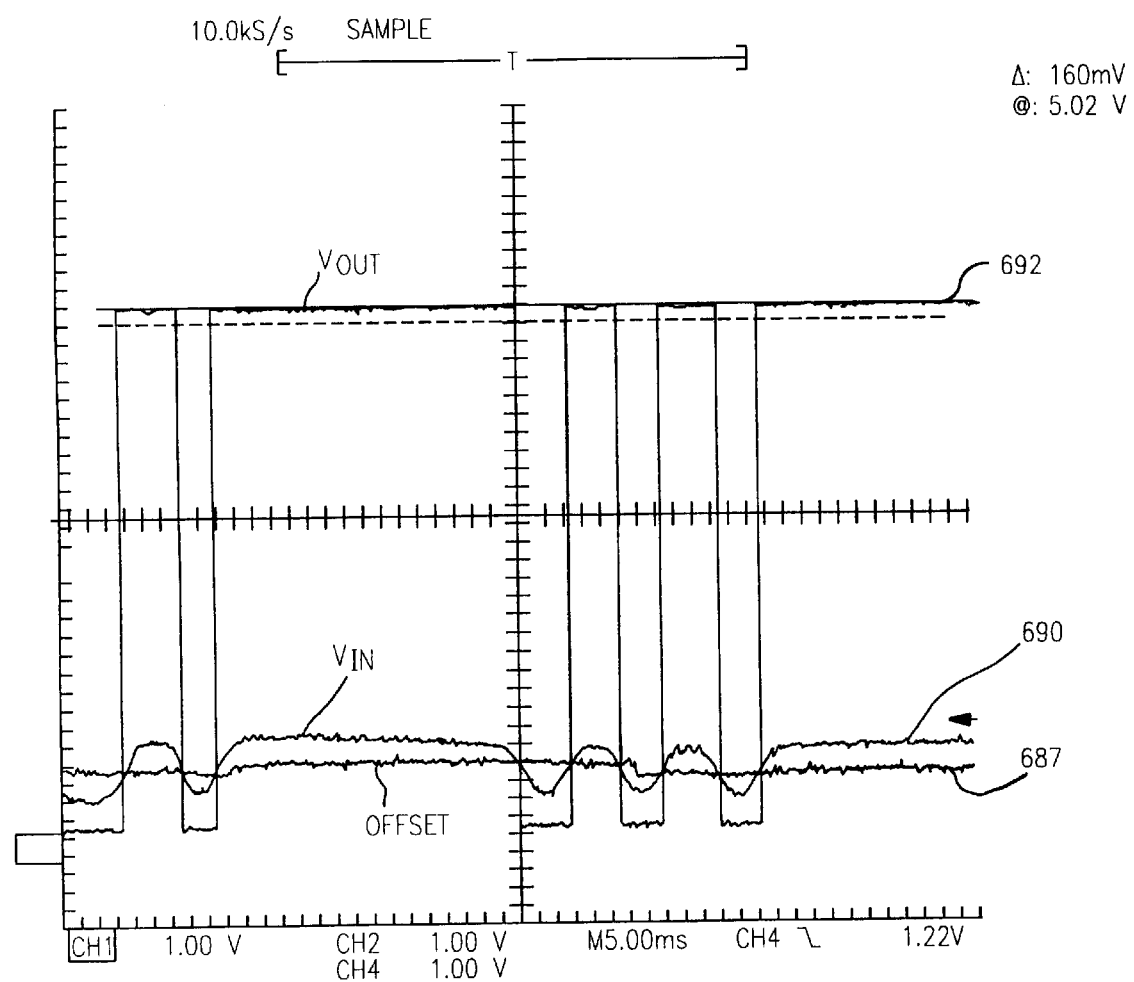
Figure 4F:
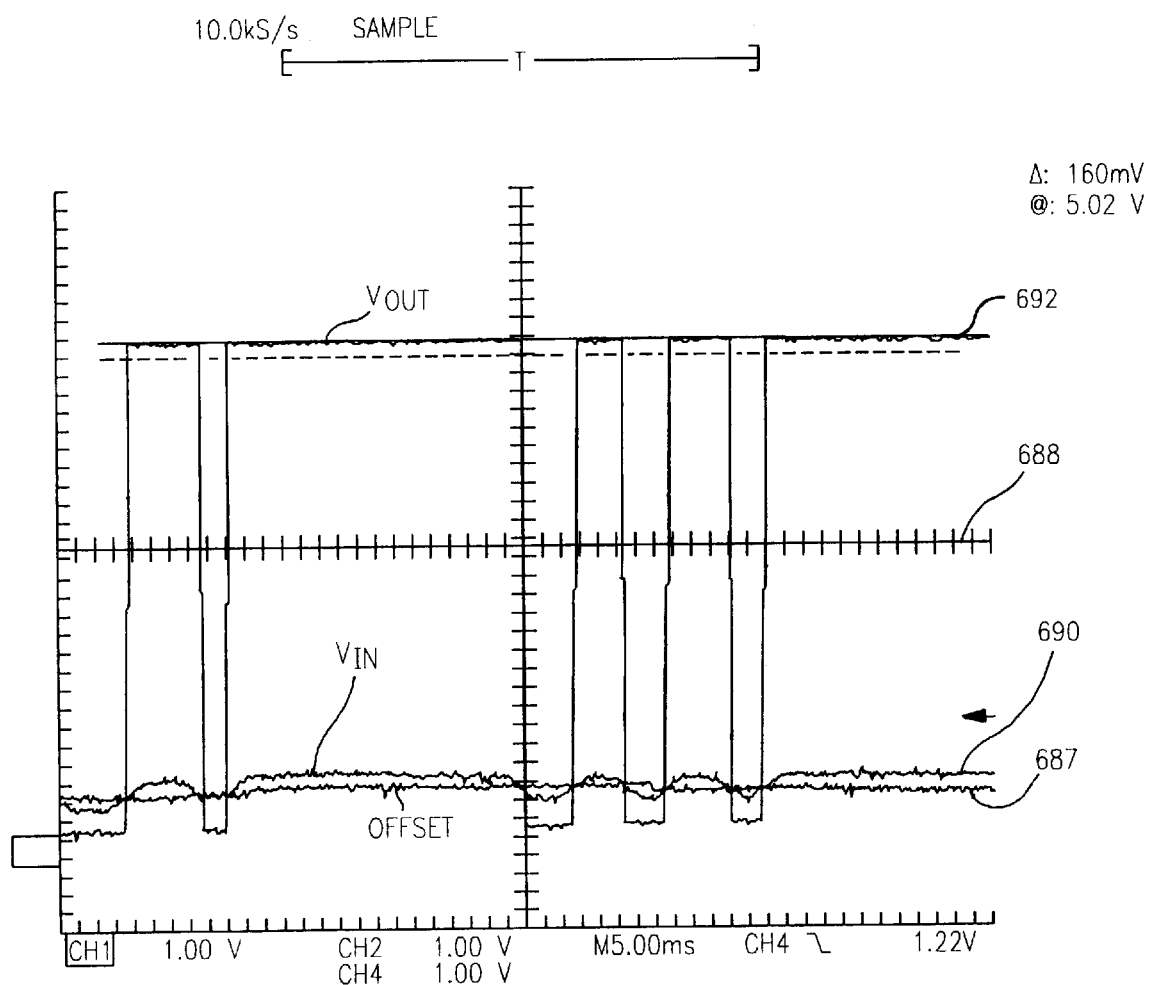

An exemplary schematic for the block diagram illustrated in FIG. 1, is provided in FIG. 2. The circuit 600 is shown coupled to a linear Hall effect sensor, such as, Hall effect sensor 614, for example, an Allegro model no. 3516. As discussed above, the compensation circuitry 600 is adapted to work with virtually any type of linear displacement or rotary sensor. The use of the Hall effect sensor 614 is merely exemplary. It should also be noted that the compensation circuitry can be formed off chip a shown in FIG. 2 or integrated with the sensor to from a monolithic smart sensor.

An analog output signal $V_{IN}$ from the sensor 614 is applied to a analog input terminal $V_{IN}$ of the ADC 608. The ADC 608 converts the analog input signal from the sensor 614 to an 8 bit digital signal, available on pins DB[0–7] of the ADC 608. The 8 bit signal from the ADC 608 is applied to input ports RB[0–7] of the microprocessor 610. As will be discussed in more detail below, the microprocessor determines the maximum and minimum voltage peaks of the analog input signal in order to determine the DC offset. Once the DC offset is determined by the microprocessor 610, the 8 bit digital value representing the DC offset, available at the output ports RC[0–7] of the microprocessor 610, is applied to the 8 bit input ports DB[0–7] of the DAC 612. The analog output from the DAC 612 is applied to a comparator 606 and compared with the original analog input signal $V_{IN}$. The output signal of the comparator 606 is a digital output signal with 0 DC offset as illustrated in FIGS. 4a–4f.

In order to adjust the output voltage range of the DAC 612, a range multiplier circuit 615 may be disposed between the output DACOUT of the DAC 612 and the input of the comparator 606. The range multiplier circuit 615 includes an operational amplifier 616 and a pair of resistors 618 and 620. As shown, the range multiplier circuit 615 is used to multiply the output voltage range of the DAC 612, nominally 0–2.56 volts, to 0–5 volts. It should be understood that the use of the range multiplier circuits 615 is optional and is dependent upon the specific DAC selected and its output range.

The comparator 606 includes a pair of gain resistors 622 and 624 as well as the scaling resistor 626 used to scale the analog input signal $V_{IN}$. The output of the comparator 606 may be applied to one or more inverters 628 and 630 for conditioning the output signal of the comparator 606. The output of the inverter 628 is inverted relative to the analog input signal whereas the output of the inverter 630 is noninverted.

The software for determining the maximum and minimum voltage peaks of the analog input signal $V_{IN}$ is illustrated in FIGS. 3a–3d. The source code is provided in the Appendix. Initially, in step 632, the interrupt vectors as well in the I/O ports of the microprocessor 610 are initialized. After the interrupt vectors and I/O ports are initialized, the STATE and STARTUP logic variables are initialized in step 634. In particular, the STATE variable is set at default while the STARTUP variable is set to one. After the logic variables are initialized, the minimum and maximum value variables MIN, MAX, LMIN and LMAX are initialized in step 635. Additionally, in step 635 the DC offset value is set=0×7 F (hexidecimal 7 F), about 2.5 volts, half of the voltage range of the comparator 606, to provide an initial reference value for determining the logic state on powerup. This DC offset value is written to the D/A 612 in step 637. After the initialization process, the 8 bit digital value from the ADC 608 is read and set equal to a variable VOLTAGE, in step 639. After the 8 bit voltage is read from the ADC 608, the STATE logic variable is checked in steps 630A and steps 632A. As mentioned above, initially the STATE logic variable is set at the default value. Thus the system initially proceeds to step 634A where the 8 bit voltage read from the ADC 608 is compared with the minimum and maximum value variables MIN and MAX in step 634 and step 636. As mentioned above, the system determines the minimum and maximum peaks of the analog input voltage. Thus, in step 634A, if the voltage read from the ADC 608 is determined to be less than the minimum voltage (initially set to OXFF in step 635), the minimum voltage variable MIN is set equal to that voltage in step 638. Otherwise, the system proceeds to step 636 where the voltage read from the ADC is compared with the maximum voltage MAX. If the voltage read from the ADC 608 is greater that the maximum voltage (initially set 0 in step 635), the maximum voltage variable MAX is set equal to that voltage in step 640.

The system then proceeds to step 642 and calculates the DC offset DC_OFFSET. The DC offset DC_OFFSET is determined by summing the minimum and maximum voltages and dividing by two. After the DC offset DC_OFFSET is determined, the system determines whether the logic variable STARTUP is equal to one or zero. As stated above, initially the logic variable STARTUP is set equal to logic one. As such, the system initially proceeds to step 646 and determines whether the voltage read from the ADC 608 is less than the calculated offset voltage DC_OFFSET. The system loops back to 639 and reads another voltage in the ADC 608. If the voltage read from the ADC 608 is less than calculated DC_OFFSET, the system proceeds to step 648 and changes the state of the logic variable STARTUP to equal 0 and then loops back to step 639 to read another voltage from the ADC. The system then repeats steps 630A through 642 and calculates a new offset based on the new voltage read from the ADC 608.

In step 644, if the state of the logic variable STARTUP is set to 0, then the system proceeds to step 650 to determine if the voltage read from the ADC 608 is greater than the calculated offset DC_OFFSET. If not, the system loops back step 639 to read another voltage and proceeds through steps 630A–642 to calculate another DC offset DC_OFFSET. If the voltage is greater than the calculated DC offset DC_OFFSET which indicates that a voltage above the last calculated DC offset, the system proceeds to 652 and sets the state of the logic variable STATE high in order to calculate the high voltage peak. The system then proceeds to step 654 and writes the last calculated DC offset to DC 612 in step 654. The system then loops back to step 639 and reads another ADC voltage and proceeds to step 630A.

As mentioned above, the system checks in steps 630A to see if the STATE logic variable is set to equal high. If so, the system proceeds to step 656 and checks whether the last voltage read from the ADC 608 is greater than the variable LMAX. If not, the system proceeds to step 658 and checks to see whether the voltage is less than the calculated DC offset. If not, the system loops back to step 639 and reads another voltage MIN from the ADC 608. If the last read voltage from the ADC 608 is greater than the maximum voltage LMAX, the variable LMAX is set to equal that voltage in step 660. After the voltage is set equal LMAX, the DC offset is calculated by summing the minimum voltage and the LMAX voltage and dividing it by two in step 662. After the new DC offset DC_OFFSET is calculated in 662, the system checks in step 664 to determine if the voltage LMAX is greater than MAX. If so, the DC offset calculated in step 662 is written to the DAC 612 in step 666. Afterwards the system proceeds to step 658. Otherwise, if the voltage LMAX is not greater than MAX, the system proceeds directly to step 658 and determines whether than the voltage read from the AD 608 is less than DC offset DC_OFFSET.

If not, the system loops back to step 639 and reads another voltage from the ADC 608. If the voltage is less than the DC offset, the system proceeds to step 668 and sets the STATE of the logic variable to low, after which the variable MAX is set equal to the variable LMAX while the variable LMIN is set equal to OXFF in step 670. The system subsequently loops back to step to 639 and reads another voltage. If the system is in a low state (i.e. STATE=LO), as determined in step 632A, the system checks in step 672 whether the voltage read from the ADC 608 is less than the variable LMIN. If so, the variable LMIN is set equal to that voltage in step 674. The offset is then calculated in step 676 by adding the variable LMIN and MAX and dividing by two. After the offset is determined in step 676, the system checks in 678 whether the voltage LMIN is less than MIN. If so, the DC offset is written to the DAC 612 in step 680. The system then proceeds to steps 682. Otherwise the system proceeds directly to step 682. In step 682, the system determines whether the voltage is less than the DC offset. If so, the system is determined to be in the low state and the system loops back to step 639 and reads another voltage. Otherwise, the system changes to the high state in step 684 and sets the minimum voltage MIN equal to LMIN and variable LMAX equal to 0 in step 686.

The determination of the DC offset is an iterative process. Once the DC offset is determined, this value is applied to the DAC 612 to convert the DC offset value to an analog value. The output of the DAC 612 along with the sensor output signal is then applied to the comparator 606 to generate a digital output signal.

FIGS. 4a to 4f illustrate the application of the invention. In particular, an exemplary analog input signal $V_{IN}$ 690 and output signal from the electronic circuit in accordance the present invention are illustrated for different DC offsets. As shown, as the DC offset level 687 of the analog input signal $V_{IN}$ moves downward as illustrated in FIGS. 4a–4f, the output signal $V_{OUT}$ 692 remains symmetric to a 0 voltage axis.

In an alternate embodiment of the invention, the electronic circuitry is dynamic. In this embodiment, the circuitry dynamically determines the DC offset level of the incoming sensor analog output signal. The DC offset level is applied to a comparator along with the original sensor analog output signal to provide a digital output signal.

Obviously, many modifications and variations of the present invention are possible in light of the above teachings. Thus, it is to be understood that, within the scope of the appended claims, the invention may be practiced otherwise than as specifically described above.

What is claimed is:

1. An electronic circuit for dynamically compensating a sensor output signal, the circuit comprising:

one or more terminals for receiving said sensor output signal, said sensor output signal defining an uncompensated sensor output signal;

a circuit for receiving said uncompensated analog output signal and automatically and continuously determining the DC offset value of said uncompensated sensor output signal, defining a DC offset circuit; and a comparator for receiving said uncompensated sensor output signal and said DC offset value and comparing said uncompensated sensor output signal with said DC offset value and dynamically generating a compensated sensor output signal which has been compensated for said DC offset value.

2. The electronic circuit as recited in claim 1, wherein said sensor output signal is an analog signal.

3. The electronic circuit as recited in claim 2, wherein said DC offset circuit includes an analog to digital converter.

4. The electronic circuit as recited in claim 3, wherein said DC offset circuit includes a microprocessor.

5. The electronic circuit as recited in claim 4, wherein said DC offset circuit includes a digital to analog convertor.

6. The electronic circuit as recited in claim 1, wherein said DC offset circuit includes means for providing a predetermine DC offset level at power up.

7. The electronic circuit as recited in claim 6, wherein said predetermined DC offset level is selected to be about half of the operating range of said comparator.

* * * * *